United States Patent [19]

Bossens et al.

[11] 4,087,097

[45] May 2, 1978

[54] SEALING DEVICE FOR THE EMERGENT SHAFT END OF A ROTATING MACHINE

[75] Inventors: Jacky Bossens, Pont-Saint-Esprit; Jean Louis Lacourieux, Bourg-les-Valence, both of France

[73] Assignee: Commissariat a l'Energie Atomique, Paris, France

[21] Appl. No.: 766,578

[22] Filed: Feb. 8, 1977

[30] Foreign Application Priority Data

Feb. 9, 1976  France .............................. 76 03499

[51] Int. Cl.² .............................................. F16J 15/40
[52] U.S. Cl. ......................................... 277/3; 277/65; 277/76; 277/83
[58] Field of Search ....................... 277/33, 62, 70, 76, 277/83, 92, 93, DIG. 8, 67, 65, 3

[56] References Cited

U.S. PATENT DOCUMENTS

| | | | |
|---|---|---|---|
| 3,035,841 | 5/1962 | Riester | 277/83 |
| 3,880,434 | 4/1975 | Echard et al. | 277/75 |
| 3,921,986 | 11/1975 | Geary | 277/83 |
| 3,951,417 | 4/1976 | Cheruykh | 277/83 |

FOREIGN PATENT DOCUMENTS

1,282,719  7/1972  United Kingdom ................... 277/67

Primary Examiner—Herbert F. Ross
Attorney, Agent, or Firm—Sidney W. Millard

[57] ABSTRACT

The device comprises a first dry seal and an admission chamber for controlled leakage of a neutral barrier gas at a pressure of slightly higher value than the pressure of the hazardous gas which is thus prevented from passing through the seal. The pressure difference across the first seal is maintained at a low and constant value by an external regulator. A second seal closes the admission chamber and is supplied with barrier gas at a pressure of higher value than the pressure of the external atmosphere. Leakage of the barrier gas from the second seal is discharged along with any leakage of hazardous gas through the first seal into an external recovery circuit. The leakage of barrier gas from the admission chamber is into an adjacent compartment defined by the second seal and by a floating ring which produces a pressure drop so as to prevent the external atmosphere from penetrating into the compartment.

4 Claims, 3 Drawing Figures

SEALING DEVICE FOR THE EMERGENT SHAFT END OF A ROTATING MACHINE

This invention relates to a sealing device which is primarily intended to prevent leakage of a gaseous fluid which is both toxic and hazardous, said fluid being contained within the casing of a rotating machine such as a compressor or a pump. Such leakage is liable to take place through the space which is necessarily formed between the shaft of said machine and said casing near the output region of the shaft in which this latter is coupled to suitable driving means.

A number of different standard solutions have already been proposed for the purpose of forming a seal of this type. In particular, reference can be made to the use of gland seals of the stuffing-box type or else the mechanical seals of the contact type in which a friction shoe is rigidly fixed to a stationary or rotating portion of the machine in cooperating relation with a bearing pad which is applied against said shoe while being associated on the other hand with the rotating portion or the stationary portion. Finally, it has already been proposed to incorporate with packing glands of this type a suitably adapted circulation of a barrier gas at a higher pressure than that of the fluid within the casing. In this manner, inevitable leakages through the packing glands or seals employed are suitably swept by said barrier gas and carried away with this latter into an auxiliary recovery circuit while the hazardous gas is prevented from passing beyond the barrier to the external atmosphere.

In one design which is also known and is related to the general arrangements recalled in the foregoing, it has been proposed to achieve leak-tightness by employing two successive friction seals mounted in spaced relation on the rotating shaft so as to define between said seals a chamber for the admission of the barrier gas under a pressure which is slightly higher than that of the fluid within the casing but lower than or equal to the pressure which prevails outside said chamber in the opposite region, in particular in the external atmosphere. Under these conditions, leakages of the barrier gas through the first seal on the same side as the fluid within the casing take place mainly in the direction of mixing of said barrier gas with the fluid. However, it is not possible to prevent a very small but nevertheless real back-diffusion of the hazardous fluid through the first seal; this fluid is then mixed with the barrier gas within the gas admission chamber and this mixture is recovered in an external circuit. On the other hand, an appreciably larger pressure difference exists on each side of the second seal between on the one hand the barrier gas and on the other hand the external atmosphere in which there can also be present aerosols of oil or of a lubricant for the roller-bearings or journal-bearings which support the rotating shaft. The air and the aerosols therefore pass preferentially through the second seal and then mix with the barrier gas within the admission chamber before being also recovered in an external circuit. In point of fact, in a known design of this type, it is not wholly unlikely that a fraction of the air and oil which has penetrated into the admission chamber after passing through the second seal may subsequently pass through the first seal and mix with the hazardous fluid within the casing. Moreover, the back-diffused fluid can in turn pass in countercurrent flow through the second seal and spread to the external atmosphere. Leak-tightness of the packing-gland is therefore not wholly reliable.

The present invention relates to a novel arrangement of sealing means for a rotating shaft in a device of the type described in the foregoing. This arrangement overcomes the disadvantages attached to design solutions at present adopted and makes it possible to achieve strict leak-tightness between the gaseous fluid within the casing of the machine and the external atmosphere by virtue of a particular distribution of pressures and a different arrangement of the seals or sealing barriers within the device. This latter also makes it possible to limit the consumption of barrier gas to the minimum value which is necessary to achieve the requisite standard of leak-tightness.

To this end, the device under consideration which is capable of achieving leak-tightness between a toxic or hazardous gaseous fluid at a given pressure and the external air which may be mixed with aerosols in suspension of a lubricant essentially comprises in succession a first dry seal for separating the gaseous fluid within the casing of the machine and an admission chamber for a controlled leakage of a neutral barrier gas at a pressure of slightly higher value than the pressure of the gaseous fluid in order to prevent said fluid from passing through said seal, the difference between the pressures on each side of said first seal being of a low order and maintained at a constant value by a regulator placed externally of the device. The admission chamber is closed on the side opposite to the first seal by means of a second seal comprising a thrust ring rigidly fixed to the rotating shaft of the machine. The thrust ring being supplied with the barrier gas at its sealing face with the pressure of the gas being of higher value than the pressure of the external atmosphere. The leakage from the face of the thrust ring into the admission chamber is discharged with the leakage of the gaseous fluid which has passed through the first seal by back-diffusion into an external recovery circuit whilst the leakage of the barrier gas to the exterior of the admission chamber is admitted into an adjacent compartment defined on one side by the second seal and on the other side by a floating ring mounted within the casing and applied with limited play against a bearing surface which forms part of the rotating shaft, said floating ring being intended to produce a pressure drop which prevents penetration of the external atmosphere into the compartment.

The device under consideration thus provides on each side of the second seal, not only and in accordance with an arrangement known per se, two sealing enclosures consisting respectively of a chamber and a compartment for the admission of leakages of the barrier gas derived from the face of the second seal but also a distribution of pressures between the gaseous fluid within the casing, the barrier gas within the two enclosures and the external atmosphere such that leak-tightness between said fluid and said atmosphere is ensured in a reliable and efficient manner. In accordance with the invention, the pressure of the barrier gas injected against the face of the thrust ring is in fact determined so as to prevent on the one hand the leakage flow of toxic gas from the admission chamber to the compartment and on the other hand the flow of air which may be present within said compartment towards said admission chamber. The floating ring produces a sufficient pressure drop to ensure that the pressure within the compartment is higher than the pressure of the external atmosphere.

Moreover, it is known that seals and especially seals of the friction type operate satisfactorily only within a predetermined range of pressures, the performances of these seals being better when the difference between the pressures on each side is small, constant and unidirectional. The present invention secures the advantage in particular of complying with this requirement since the pressure of the barrier gas within the admission chamber after it flows past the second seal can be adjusted at will so as to have a value which is slightly in excess of the pressure of the gaseous fluid within the casing. The difference between these pressures is adjustable and can be maintained at a constant value by means of the pressure regulator.

As an advantageous feature, the regulator for adjusting the pressure within the admission chamber between the first and second friction seal essentially comprises a valve controlled by an elastic diaphragm. Said diaphragm is subjected on one face to a pressure which is equal to the pressure of the gaseous fluid within the casing and on the other face to the pressure of the barrier gas within the admission chamber increased by the difference between the pressures to be maintained on each side of the first seal.

In accordance with another characteristic feature, the pressure within the chamber between the first and second dry friction seals is delivered by the regulator at the time of admission and calibrated by a sonic nozzle at the time of discharge.

Further distinctive features of a sealing device for the exit end of the shaft of a rotating machine as constructed in accordance with the invention will become apparent from the following description of one exemplified embodiment which is given by way of indication and not in any limiting sense, reference being made to the accompanying drawings, wherein.

Figure 1:
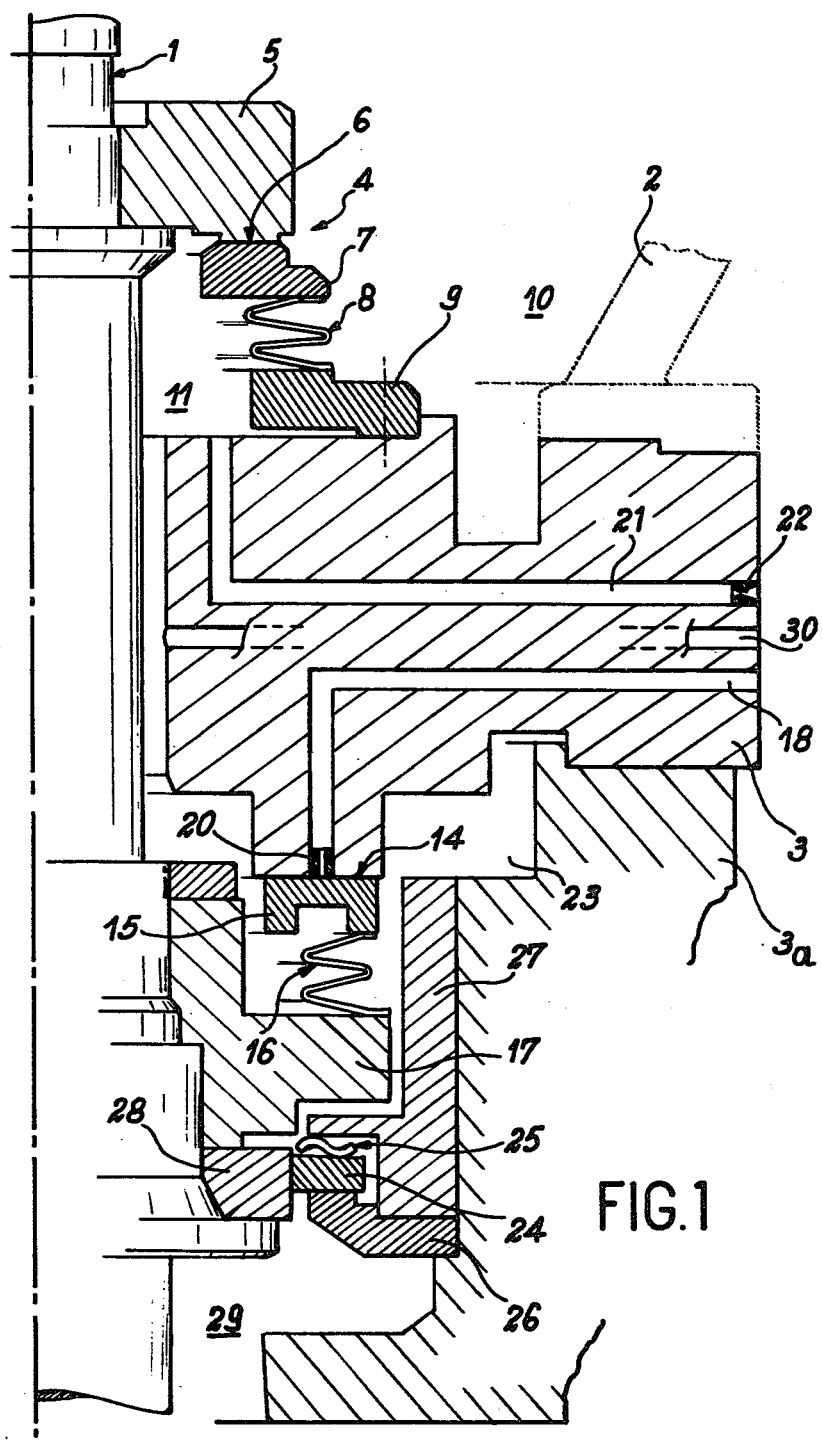
FIG. 1 is a half-sectional view in elevation showing the device under consideration.

In FIG. 1, the reference numeral 1 designates the shaft of a rotating machine such as a compressor or pump which is primarily intended to effect the displacement of a toxic or hazardous and gaseous fluid. This rotating machine comprises a casing 2 illustrated in phantom and provided with an extension in the form of an annular sleeve 3. Said sleeve is in turn traversed by the shaft 1 and intended to contain the device proper so as to ensure leak-tight separation between the hazardous gas contained within the casing and the external atmosphere. In the example of construction under consideration, the shaft 1 as illustrated has a vertical axis and the top portion which penetrates into the casing is connected to the impeller of the pump or compressor. The lower end of said shaft is intended to be coupled to a driving motor by means of a flange or housing 3a, the impeller and the motor having been omitted from the drawings in order to simplify these latter.

In accordance with the invention, a first seal between the casing 2 and the sleeve 3 at the point of traversal of the shaft 1 is formed by a dry friction seal 4 comprising mainly a transverse ring 5 which is fixed on the shaft 1. Said ring has a flat bearing surface 6 which forms a bearing pad and this latter is applied against an oppositely-facing shoe 7. Said shoe is connected elastically by means of a bellows seal 8 to a second ring 9 which is in turn rigidly fixed with respect to the stationary sleeve 3. Under these conditions, the seal 4 provides a separation between the region 10 which is located within the casing 2 and contains the hazardous gas, and a chamber 11 which is formed within the interior of the sleeve 3 beyond the seal 4. Said chamber 11 is subjected to a pressure of slightly higher value than the pressure existing within the region 10 by admitting leakages of an auxiliary barrier gas such as nitrogen, for example, into said chamber, said leakages being derived from a duct 18 within the sleeve 3. A second seal is formed at the lower portion of sleeve 3 which has a flat bearing surface 14 in oppositely-facing relation to a movable thrust ring 15, said ring being joined by means of a bellows seal 16 to a supporting ring 17 which is rigidly fixed to the shaft 1. The force or bias exerted by the bellows seal 16 on the thrust ring 15 is sufficient to apply this latter against the bearing surface 14. At the level of the bearing surface 14, leak-tightness is achieved by the auxiliary neutral gas which is admitted under high pressure within the interface between the sleeve and the thrust ring by a means of a duct 18 formed within the sleeve 3. At least one nozzle 20 is formed in the duct 18 at the end adjacent to the bearing surface 14. Part of the barrier gas leakage which comes from the nozzle 20 and escapes along the bearing surface 14 thus collects within the chamber 11 and maintains within this latter a pressure which is lower than that of the gas at the point of admission but also slightly higher than that which prevails within the casing 2 in the region 10. This pressure difference is maintained substantially constant during operation. The flow of gas collected within the chamber 11 is then continuously discharged from this latter through a second duct 21, the end of which is fitted with a sonic nozzle 22.

Similarly, the barrier gas leakage which escapes along the bearing surface 14 on the side remote from the chamber 11 collects within a compartment 23 which is also formed within the interior of the stationary sleeve 3. Said compartment is delimited on one side by the second seal described earlier and on the other side by a simple floating ring 24. This latter is applied by means of a spring 25 against an annular shoulder 26 of a member 27 which is fixed internally of the flange 3a, and bears laterally against a ring 28 which is rigidly fixed to the shaft 1. The floating ring 24 thus separates the region located internally of the compartment 23 from an outer region 29 in which the surrounding atmosphere usually prevails, especially air which may be charged with aerosols of the oil or lubricant of the bearings (not shown) of the rotating machine.

The sealing device thus formed consequently defines four successive enclosures corresponding respectively to the region 10, to the chamber 11, to the compartment 23 and to the region 29 in which the fluid pressures contained therein are adjusted in accordance with the invention so as to prevent any communication between the toxic gas within the casing 2 and the external atmosphere. In particular, the use of a second seal with a controlled barrier gas leakage for the purpose of separating barrier gas leakages on each side of this latter has an advantage in that said second seal is accordingly caused to maintain practically the entire pressure difference existing between the external atmosphere within the region 29 and the toxic gas within the region 10 inside the casing of the machine. Under these conditions, the floating ring 24 which is mounted within the compartment 23 serves solely for the purpose of producing a pressure drop in the barrier gas leakage so as to ensure that the pressure within said compartment 23 is slightly higher than the pressure within the region 29. This prevents upward flow towards the second seal of aerosols of lubricant or traces of oil which are present in the atmosphere while producing on the contrary a limited leakage of the barrier gas towards said atmosphere. Similarly, since the pressure within the chamber 11 is slightly higher than the pressure of the toxic gas within the region 10, the flow of said gas through the dry seal 4 cannot normally take place except for a small fraction which passes upwards through the seal by back-diffusion. The mixture with the neutral gas within the chamber 11 is in any case recovered by the duct 21 and the nozzle 22 and directed towards an external extraction circuit. In all cases, the traces of toxic gas cannot pass through the seal.

Figure 2:
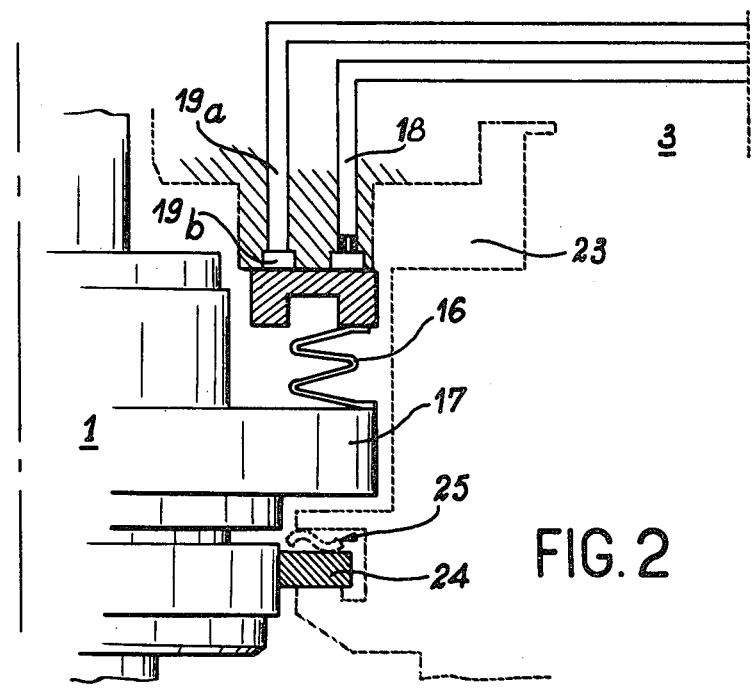
FIG. 2 illustrates an alternative form of construction of a detail of the device shown in FIG. 1.

Distribution of the flow of barrier gas through the bearing surface 14 is adjusted at the time of construction of the device by modifying the position and the caliber of the nozzle 20 as well as the gas supply pressure. As can readily be understood, alternative forms of seals could also be employed. By way of indication, there is shown in FIG. 2 an alternative form in which the sleeve is provided with a second barrier gas duct 19a in which the barrier gas can be delivered at a pressure which is different from the pressure existing within the adjacent duct 18. In accordance with a known arrangement, this duct 19a opens into an annular groove 19b formed in sleeve opposite to the thrust ring 15. Depending on the pressure which prevails within said duct 19a, it is possible to withdraw or on the contrary to add barrier gas and thus to increase or reduce the quantity of said gas which escapes towards the chamber 11 and the compartment 23. By virtue of these arrangements, it becomes possible to obtain within these enclosures pressures which are as close as possible to the pressure existing respectively in the region 10 and in the region 29.

Figure 3:
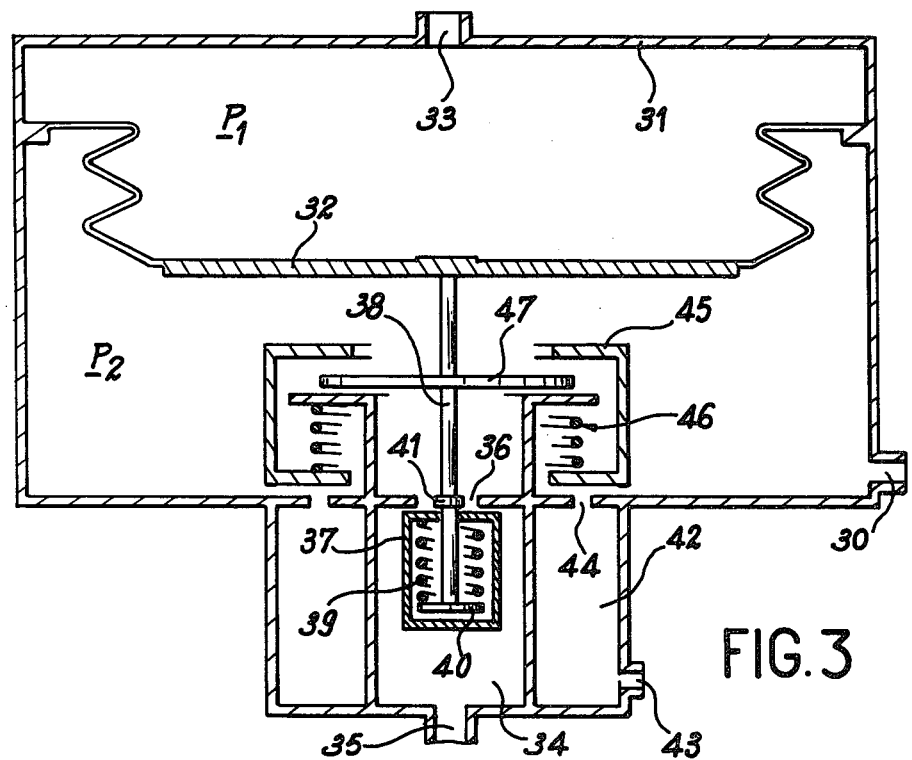
FIG. 3 is a diagram of a pressure regulator which is associated with the device.

In order to maintain a limited but constant pressure difference across the seal 4 with a view to ensuring higher efficiency of this latter irrespective of the pressure within the region 29, the sealing device in accordance with the invention is advantageously associated with a regulator for modifying the pressure which prevails precisely within the chamber 11. To this end, said chamber is connected through a duct 30 to the outlet of a regulator of this type, the constructional design of which is illustrated diagrammatically in FIG. 3.

This regulator comprises in paticular a leak-tight casing 31 which is divided into two complementary enclosures by means of an elastic diaphragm 32. One face of said diaphragm is subjected to the pressure $P_1$ of the toxic gas in the region 10 within the casing 2, said region being connected to the casing 31 by means of a duct 33. The other face of the diaphragm is subjected to the pressure $P_2$ which prevails within the chamber 11, the casing being connected to this latter by means of the duct 30. The casing 31 is also associated with a second enclosure 34 and this latter is connected through an orifice 35 to the high-pressure distribution of the barrier gas which is directed towards the second seal by means of the duct 18. This enclosure 34 communicates with the region of the casing 31 at the pressure $P_2$ through an orifice 36 which is normally closed-off by a movable valve 37. Said valve 37 is slidably mounted on a rod 38 rigidly fixed to the diaphragm 32 and is applied against its seating by a spring 39 supported on a plate 40 which is rigidly fixed to the rod 38. The valve 37 can be displaced from its seating by a collar 41 which is rigidly fixed to the rod 38, leak-tightness at the point of penetration of this latter through the valve 37 being achieved by designing this latter in the form of a casing which contains the plate 40 and the spring 39. A second enclosure 42 surrounds the enclosure 34 and is connected through an orifice 43 to a low-pressure system for the supply of the same barrier gas. Said enclosure 42 has a number of orifices 44 which are formed in the base of the casing 31 and provide a communication with this latter. Said orifices 44 are normally closed-off by a second valve 45 of circular shape which is maintained applied against its seating by a spring 46. The displacement of a disc 47 which is fixed on the rod 38 has the effect of lifting the annular valve 45.

The operation of the sealing device which is associated with the above-described regulator takes place as follows: the regulator being supplied with auxiliary barrier gas at a high pressure of the order of 2 to 3 bar through the orifice 35 which is connected to the enclosure 34, the duct 33 is put into communication with the region 10 which contains the toxic gas within the casing of the machine. In addition, the regulator is connected to the chamber 11 by means of the duct 30 (as shown in FIG. 1). The enclosures defined within the casing 31 by the diaphragm 32 and subjected respectively to the pressures $P_1$ and $P_2$ which prevail on the one hand in the region 10 of the casing and on the other hand in the chamber 11 are formed on each side of said diaphragm.

If the pressure $P_1$ then tends to increase with respect to the pressure $P_2$, the diaphragm 32 moves downwards in the drawing, with the result that the collar 41 exerts a force on the valve 37 which is normally maintained against its seating by the spring 39. Said valve 37 is displaced from its seating when the force exerted on the diaphragm by the difference between the pressures $P_1$ and $P_2$ is greater than the force resulting from pre-adjustment of the diaphragm 32 and the force produced by the spring 39. The barrier gas supplied from the high-pressure circuit through the enclosure 34 and the orifice 35 then penetrates into the casing 31 so as to restore the pressure difference. The displacement of the diaphragm 32 in the opposite direction again makes it possible for the valve 37 to close-off the orifice 36 and to restore the initial conditions.

The pre-adjustment of the elastic diaphragm 32 and the calibration of the spring 39 are therefore calculated so as to ensure that the difference between the pressures $P_2$ and $P_1$ is equal to a predetermined value $\Delta P$. This difference $\Delta P$ is maintained substantially constant and independent of the pressure $P_1$ within the region 10 since the rate of continuous flow of the barrier gas from the chamber 31 is adjusted to a given value by the nozzle 22. A supply which is regulated by the displacement of the valve from its seating in fact corresponds to said rate of flow of the barrier gas. When the pressure difference increases, the valve 37 returns to its seating and the pressure $P_2$ decreases under the action of the flow of barrier gas through the nozzle. On the contrary, when the pressure difference $\Delta P$ becomes too small, the valve 37 is displaced from its seating and the barrier gas is admitted into the regulator casing 31 so as to increase the pressure $P_2$, thereby increasing the differemce $\Delta P$.

But if, by virtue of the foregoing arrangements, the pressure $P_2$ follows the pressure $P_1$ with a constant difference $\Delta P$ when $P_1$ increases, this does not necessarily apply when the pressure $P_1$ decreases rapidly. In fact, in the direction of increase, the pressure $P_2$ is a function of the flow rate through the orifice 35 which can be of very high value without any attendant disadvantage. On the other hand, in the direction of a decrease in the pressure $P_1$, the pressure $P_2$ which must decrease with the rate of flow through the nozzle 22 may not follow the corresponding variation in a suitable manner. The regulator under consideration makes it possible to overcome this disadvantage and also in the direction of a reduction in the pressure $P_1$ to modify the pressure $P_2$ at a sufficiently high speed to ensure that the pressure difference $\Delta P$ is maintained constant and equal to itself.

In fact, if the pressure difference $\Delta P$ increases while $P_1$ decreases, the rod 38 of the regulator moves upwards and compresses the spring 39. Under these conditions, the disc 47 is applied against the annular valve 45 which is normally applied against its seating by the spring 46. When the force exerted on the diaphragm 32 becomes greater than the resultant of the forces produced by the springs 39 and 46, the annular valve 45 is lifted and puts the enclosure 42 into communication with the casing 31 through the orifices 44. Since said enclosure 42 is connected through the orifice 43 to a low-pressure circuit of the barrier gas, the pressure $P_2$ within the casing 31 falls rapidly until it restores the initial conditions in which the valve 45 again closes-off the orifices 44.

The discharge of the pressure regulator which is connected to the chamber 11 at the pressure $P_2$ can be connected to the admission into said chamber by means of the duct 30. By way of alternative, this regulation can be so arranged as to produce action at the outlet of the chamber on the duct 21 upstream of the nozzle 22. If so required, this can offer the advantage of reducing to a minimum the quantity of barrier gas which circulates within the device and consequently the rate of flow from the lifting gland.

In another alternative embodiment, the leakage from the second seal is recovered by the regulator which is arranged in this case with a view to adjusting the flow to be extracted in order to maintain the selected value of $\Delta P$. Certain difficulties may arise in this case from the need to correct a rapid decrease in this value $\Delta P$. One advantageous solution can accordingly consist in compensating for $\Delta P$ by causing an auxiliary valve to open, thus permitting momentary admission of a make-up quantity of the barrier gas which is withdrawn from a suitable circuit at a suitable excess pressure. This arrangement has the advantage of requiring only one line for the continuous supply of the second seal since the regulation produces action only on a fraction of the leakage flow from this gland.

As can readily be understood and as has already been brought out by the foregoing, it is wholly apparent that the invention is not limited solely to the examples which have been more especially described with reference to the accompanying drawings but extends to all alternative forms.

What we claim is:

1. A sealing device for preventing leakage of a hazardous gaseous fluid from a casing containing said fluid, said casing comprising a housing for a pump or the like with a rotable shaft from said pump extending through an opening in the casing, the sealing device being located in said opening around the shaft;
   said device comprising a chamber and a compartment arranged in sequence between the gaseous fluid in the casing and the atmosphere;
   the chamber comprising a sleeve circumscribing the shaft with first and second means for sealing its ends against the shaft;
   the compartment being formed by said second sealing means, an annular housing around the shaft and a floating ring contacting the periphery of said shaft;
   at least two ducts extending through the sleeve, the first duct being in fluid communication with the interior of said chamber for conducting gases away from said chamber, the second duct being for conducting a barrier gas toward said chamber and terminating at its inner end at a sealing face on said sleeve;
   the second sealing means being biased toward sealing contact with said sealing face, the second sealing means and sealing face being structured to allow the simultaneous flow of the barrier gas from the second duct into the chamber and the compartment;
   the pressure and volume of barrier gas flow into the compartment being great enough to maintain a pressure drop across the floating ring between the compartment and the atmosphre; and
   means for regulating a substantially constant pressure differential between the interior of the chamber and the casing.

2. A device according to claim 1, wherein the means for regulating the pressure differential comprises a valve controlled by an elastic diaphragm, said diaphragm being subjected on one face to a pressure which is equal to the pressure of the gaseous fluid within the casing and on the other face to the pressure of the barrier gas within the chamber increased by the difference between the pressures to be maintained on each side of the first seal.

3. A device according to claim 2, wherein the regulator comprises a second casing divided into two enclosures by a leak-tight elastic diaphragm, one of said enclosures being connected to the pressure of the gaseous fluid and the second enclosure being connected to the chamber, said second enclosure being also in communication through an opening closed by a movable valve with a circuit for the supply of barrier gas at a pressure of higher value than the pressure of the gaseous fluid increased by the pressure difference, said movable valve being rigidly fixed to the leak-tight diaphragm in such a manner as to ensure that the second enclosure is put into communication with the circuit for the supply of barrier gas when the leak-tight diaphragm has moved over a predetermined distance which is a function of the direction and the magnitude of the pressure difference between the two enclosures.

4. A device according to claim 3, wherein the second enclosure of the regulator is in communication with a low-pressure system for the supply of barrier gas through a second valve which is also rigidly fixed to the leak-tight diaphragm.

* * * * *